Jan. 15, 1924.
H. SELKER
BEARING
Filed Oct. 2, 1922
1,480,571
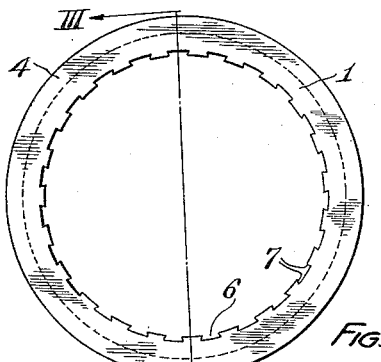
Fig. 1.
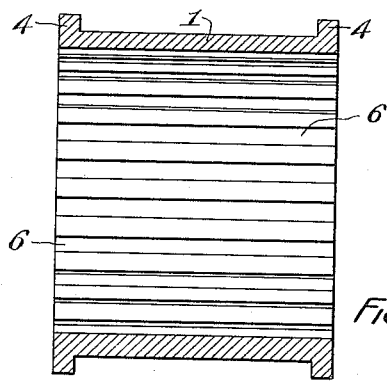
Fig. 3.
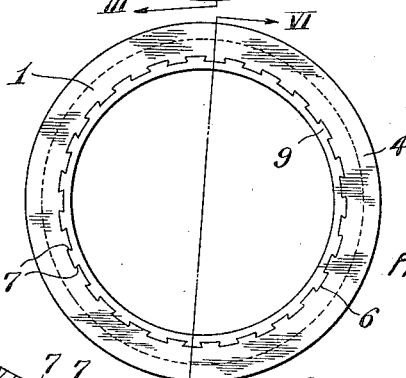
Fig. 5.
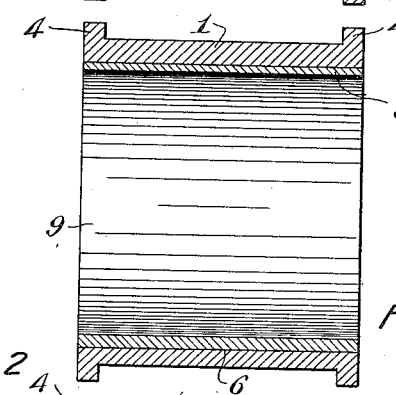
Fig. 6.
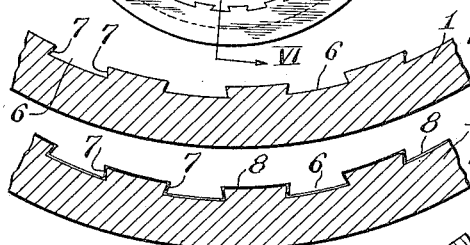
Fig. 2.
Fig. 4.
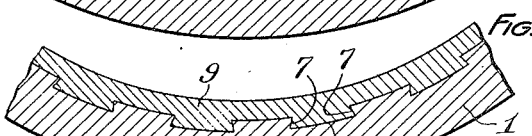
Fig. 7.
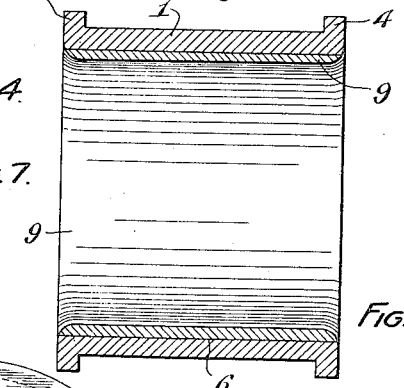
Fig. 8.
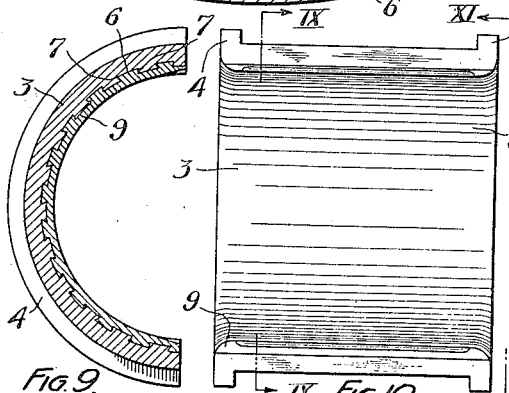
Fig. 9. Fig. 10.
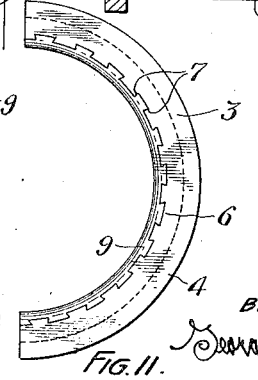
Fig. 11.
INVENTOR:
HARRY SELKER
BY
George W. Trywell
ATTORNEY.

Patented Jan. 15, 1924.

1,480,571

UNITED STATES PATENT OFFICE.

HARRY SELKER, OF CLEVELAND, OHIO, ASSIGNOR TO THE BUCKEYE BRASS AND MANUFACTURING COMPANY, OF CLEVELAND, OHIO, A CORPORATION OF OHIO.

BEARING.

Application filed October 2, 1922. Serial No. 591,697.

*To all whom it may concern:*

Be it known that I, HARRY SELKER, a citizen of the United States, resident of Cleveland, county of Cuyahoga, and State of Ohio, have invented new and useful Improvements in Bearings, of which the following is a specification, the principle of the invention being herein explained and the best mode in which I have contemplated applying that principle, so as to distinguish it from other inventions.

My invention relates to bearings and particularly to devices of this character having a relatively soft non-ferrous coating serving as a wearing surface and requiring extraneous lubrication, such as a babbitt wearing surface, as distinguished from bearings having a graphite or other so-called anti-friction or self-lubricating wearing surface. This new and improved bearing has a main body portion or support for the wearing coat, comprised of different material and forming a strengthening member. This application relates particularly to a specific form of bearing manufactured by the new and improved process described and claimed in my pending application Serial No. 504,147.

The annexed drawing and the following description set forth in detail certain improvements embodying my invention, the disclosed means, however, constituting but one of the various mechanical forms in which the principle of the invention may be applied.

In said annexed drawing:

Figure 1 represents an end view of a cylindrical tubular blank which has been produced by any well known method, preparatory to the locating upon the inner surface thereof of a babbitt coating to form my improved bearing during the carrying out of the improved method shown, described and claimed in said pending application Serial No. 504,147;

Figure 2 represents, upon an enlarged scale, a fragmentary transverse section of the elements shown in Figure 1;

Figure 3 represents a longitudinal section, taken in the plane indicated by the line III—III, Figure 1;

Figure 4 represents a section similar to Figure 2, showing in addition a layer of amalgamating material, such as solder, applied to the inner surface of the tubular blank;

Figure 5 represents an end view of the tubular member after the same has been treated with amalgamating material and a babbitt coating has been located upon the inner surface thereof and amalgamated therewith by means of the amalgamating material;

Figure 6 represents a longitudinal section, taken in the plane indicated by the line VI—VI, Figure 5;

Figure 7 represents, upon an enlarged scale, a fragmentary transverse section of the elements shown in Figure 5;

Figure 8 is a longitudinal section, similar to Figure 6, but showing, furthermore, the bearing machined to a finished form;

Figure 9 represents a transverse section, taken in the plane indicated by the line IX—IX, Figure 10, of one of the halves of a two-piece bearing;

Figure 10 represents a plan view of said half of the bearing; and

Figure 11 represents an end view, taken from the plane indicated by the line XI—XI, Figure 10.

My improved bearing is not designed as an anti-friction bearing, it being granted that the use of extraneous lubricant is necessary. The bearing is designed largely for use with hydrocarbon engines and lubricant is essential for that field of bearings in any event.

Referring to the annexed drawing in which the same parts are indicated by the same respective ordinals in the several views, 1 represents a cylindrical tubular blank which has been produced in any suitable manner, such as casting and machining, the same forming the body portion of my improved bearing in solid form, a one-half bearing member being indicated by the ordinal 3, Figures 9 to 11, when the bearing is produced by halves. These members 1 and 3 are formed with the flanges 4 by means of which they are positioned in any suitable housing, when the bearing is used, for instance, as a bearing for a crank shaft. Bearings for use in other relations will be formed, of course, for proper accommodation to such relations, for instance, a form of bearing to accommodate a cam shaft might be formed with one flange, instead of the two flanges 4 shown in Figure 2, for positioning the bearing. I form suitable slots in the inner surface of the body member 1 by means of which a soft nonferrous coating to form a wearing surface may be secured to the body member in such a manner as positively to prevent displacement of the wearing coat with relation to the body member. These slots have outwardly-divergent walls so that the coating units, preferably babbitt, which fill the slots, are wedge-shaped in cross-section and thus form keys for anchoring the babbitt. These slots may be formed in any approved manner, viz., by sand casting, die-casting, forging, extruding, shaping, broaching, etc., and the slots take the form of substantially longitudinal grooves. I then cleanse the formed blank 1 with acid, or in any other suitable way, or flux the same, after which I cover the inner surface with a material suitable for amalgamating said surface with the babbitt, and I have illustrated such a material by a thin layer of solder 8, Figure 4, this layer being therein shown of exaggerated thickness. The babbitt 9 is to be attached to the surface treated, as above described, with the amalgamating material. This babbitt is applied by any well-known method of pouring or casting babbitt. After the babbitt 9 has set, the bearing formed with the babbitt wearing surface 9, as shown in Figure 6, may be finally machined to a suitable finished form, as shown in Figure 8, if any machining is necessary, depending upon the degree of accuracy required for the use to which the bearing is to be subjected. The foregoing steps for producing my improved bearing are fully described and claimed in said pending application Serial No. 504,147.

By reason of the fact that the outwardly diverging keyways 6 are disposed longitudinally of the bearing, the babbitt liner is prevented from rotating with the shaft because, of course, when in service, the outer supporting brass shell 1 is rigidly secured. It is well known that when the babbitt becomes heated, it does not melt out immediately, but, due to the great affinity which it possesses for a clean steel surface, it tends to stick to the rotating shaft. As stated, my longitudinal keyways obviate this difficulty. Furthermore, the outer supporting part 1 of my improved bearing is a removable bearing shell and not an integral portion of the main frame or bed in which the bearing is located. The solder or amalgamating material 8 prevents the loosening up of the babbitt from the brass shell by the pounding to which the bearing is subjected. I wish also particularly to point out that the keyways 6 and the intermediate alternate projections, which are of substantially an equal width to said keyways, are comparatively narrow, there being a great number of said projections and keyways in a single bearing, as plainly shown in Figure 5, the result being that I place my reliance for a secure transverse union between the support and the liner upon these keys and keyways. If these keyways are widely spaced, then a considerable portion of the liner is unattached except for the reliance upon the amalgamating material. As stated above, I utilize the amalgamating material to serve to prevent the loosening up of the liner by the pounding to which the bearing is subjected, and not primarily to prevent the liner from turning with the rotating shaft. This last-mentioned result I secure effectively by my construction of interlocked keys and keyways. This form of bearing having comparatively narrow projections and keyways, and projections and keyways of this character of substantially equal width, is shown, described and generally claimed in said pending application Serial No. 504,147. The bearing shown in Figure 5 illustrates substantially a 2-inch bearing. It will be noted that the same contains 46 keys and keyways. This means that a key and a keyway have an aggregate width of substantially $\frac{1}{4}$-inch. Preferably, each keyway is substantially the same width as each key so that each key and each keyway is substantially $\frac{1}{8}$-inch in width. In fact, I have so shown them in Figure 5 wherein are disclosed 23 keyways 6 and 23 alternate keys. Some latitude in width of these keys and keyways is allowable for effecting the improvements of my invention, but I have found that the aggregate width of a key and keyway should be within the limits of $\frac{1}{4}$ to $\frac{3}{8}$-inch, i. e., when the keyway and key are substantially of equal width, each key and keyway should lie within the limits of $\frac{1}{8}$ to $\frac{3}{16}$-inch width.

I wish particularly to point out several reasonable observations concerning the strength and efficiency of my improved bearing and some of the differences distinguishing the same from a so-called anti-friction bearing, for instance, a graphite bearing. The metallic shell or support 1 which I provide, preferably a non-ferrous support, such as brass, strengthens the babbitt so that the same, due to its adherence to the support and its anchorage, will not become displaced during assembling, handling or transporting, or be pounded out in service. The metallic support also provides a good conductor for conveying the heat from the bearing. On the other hand, the babbitt coating provides a soft wearing surface which will not readily score the shaft or other element moving swiftly over the bearing surface. Finally, the brass and babbitt, by the aid of the amalgamating material, such as solder, firmly and closely adhere one to the other. As regards the so-called anti-friction bearings, the same do not allow a bearing pressure for the same area equivalent to that allowed by my babbitt bearing. Also, the so-called anti-friction material, such as graphite, which is applied in paste form, as distinguished from my pouring operation, disintegrates and is pounded out under a hammering load so that it squeezes out from the ends of the bearing. Furthermore, in any use of an anti-friction bearing in a hydrocarbon engine, where my improved bearing probably finds its best application, the anti-friction material, which would there require extraneous lubricant also, is washed longitudinally out by reason of the rotating shaft and by reason of the oil stream.

What I claim is:

1. A removable bearing member comprising, an outer annular supporting member and an inner wearing member wedged together by complementary longitudinal non-parallel-sided projections and slots formed, respectively, upon and in said supporting and wearing members, the aggregate width of a projection and adjacent slot lying within the limits of ¼-inch and ⅜-inch; and amalgamating material securing said members together, substantially as shown and described.

2. A removable bearing member comprising, an outer annular supporting member and an inner wearing member wedged together by complementary longitudinal non-parallel-sided projections and slots formed, respectively, upon and in said supporting and wearing members, said projections and slots being substantially of equal width, said width being between ⅛-inch and $\frac{3}{16}$-inch; and amalgamating material securing said members together, substantially as shown and described.

Signed by me this 30th day of September, 1922.

HARRY SELKER.